United States Patent
Tseng et al.

(10) Patent No.: US 7,007,178 B2
(45) Date of Patent: Feb. 28, 2006

(54) VOLTAGE ADAPTOR CARD FOR MOTHERBOARD

(75) Inventors: Yi-Kang Tseng, Hsin-Tien (TW); Wen-Ching Chang, Hsin-Tien (TW)

(73) Assignee: VIA Technologies, Inc., Taipei (TW)

( * ) Notice: Subject to any disclaimer, the term of this patent is extended or adjusted under 35 U.S.C. 154(b) by 480 days.

(21) Appl. No.: 10/286,903

(22) Filed: Nov. 4, 2002

(65) Prior Publication Data
US 2004/0017114 A1   Jan. 29, 2004

(30) Foreign Application Priority Data
Jul. 24, 2002   (TW) ............................... 91211313 U

(51) Int. Cl.
*G06F 1/26* (2006.01)
*H02M 1/00* (2006.01)

(52) U.S. Cl. .................... 713/300; 710/62; 710/74; 235/487; 235/492

(58) Field of Classification Search ................ 713/300; 235/492, 487; 710/62, 74
See application file for complete search history.

(56) References Cited

U.S. PATENT DOCUMENTS

| | | | | |
|---|---|---|---|---|
| 5,497,037 A | * | 3/1996 | Lee et al. ...................... | 307/42 |
| 5,758,100 A | * | 5/1998 | Odisho ......................... | 710/301 |
| 5,911,050 A | * | 6/1999 | Egan et al. ................... | 710/100 |
| 6,031,297 A | * | 2/2000 | Louis et al. ................... | 307/43 |
| 6,091,617 A | * | 7/2000 | Moran ........................... | 363/142 |
| 6,256,692 B1 | * | 7/2001 | Yoda et al. ................... | 710/104 |
| 6,264,506 B1 | * | 7/2001 | Yasufuku et al. ............ | 439/638 |
| 6,269,416 B1 | * | 7/2001 | Meier et al. ................. | 710/301 |
| 6,554,195 B1 | * | 4/2003 | Chang et al. ................ | 235/492 |
| 6,701,400 B1 | * | 3/2004 | Hayes et al. ................. | 710/301 |
| 6,841,898 B1 | * | 1/2005 | Moran .......................... | 307/80 |

\* cited by examiner

*Primary Examiner*—A. Elamin
(74) *Attorney, Agent, or Firm*—Rabin & Berdo, P.C.

(57) ABSTRACT

A voltage adaptor card. The voltage adaptor card, inserted into a motherboard having first slots to provide a first voltage source, includes second slots, a plurality of pins for inserting into the first slots, and a voltage converter having an input terminal and an output terminal. The input terminal is coupled to the first voltage source through the plurality of pins. The output terminal is coupled to the second slots and outputs a second voltage source.

17 Claims, 2 Drawing Sheets

VOLTAGE ADAPTOR CARD FOR MOTHERBOARD

BACKGROUND OF THE INVENTION

1. Field of the Invention

The present invention relates to a voltage adaptor card for a motherboard, and particularly to a voltage adaptor card which provides required voltage through slots.

2. Description of the Related Art

Owing to low power requirement and progress in semiconductor fabrication, operating voltages of most integrated circuits are reduced, as are most PCI interface cards. Because PCI slots on motherboards compliant with only the outdated PCI spec only provide 5V voltage without 3.3V voltage, either the motherboard compliant with only the outdated PCI spec or the PCI card itself must be modified to provide both 5V and 3.3V voltages.

To avoid modification of motherboards compliant with only the outdated PCI spec or PCI interface card, there is a need for a voltage adaptor card which provides required voltages.

SUMMARY OF THE INVENTION

It is therefore an object of the present invention to provide a motherboard with a single voltage source, providing various voltage sources required by interface cards.

To achieve the above objects, the present invention discloses a voltage adaptor card to adapt voltage supplied from the motherboard to that suitable for interface cards.

The voltage adaptor card in the present invention includes a voltage converter, PCI slots, and pins. The voltage converter includes a regulator and an adjustment circuit. The PCI slots provide 5V voltage. An output of the regulator provides interface cards inserted in the PCI slots 25 with 3.3V voltage.

The regulator has an input terminal, an adjustment terminal, and an output terminal. The input terminal of the regulator is coupled to the first voltage source through the pins.

The adjustment circuit has an input terminal and an output terminal. The input terminal of the adjustment circuit is coupled to the output terminal of the regulator. The output terminal of the adjustment circuit is coupled to the adjustment terminal of the regulator.

The adjustment circuit is implemented by a first resistor and a second resistor. The first resistor is coupled between the input terminal of the adjustment circuit and the output terminal of the adjustment circuit. A second resistor is coupled between the output terminal of the adjustment circuit and a ground potential.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE INVENTION

Figure 1:
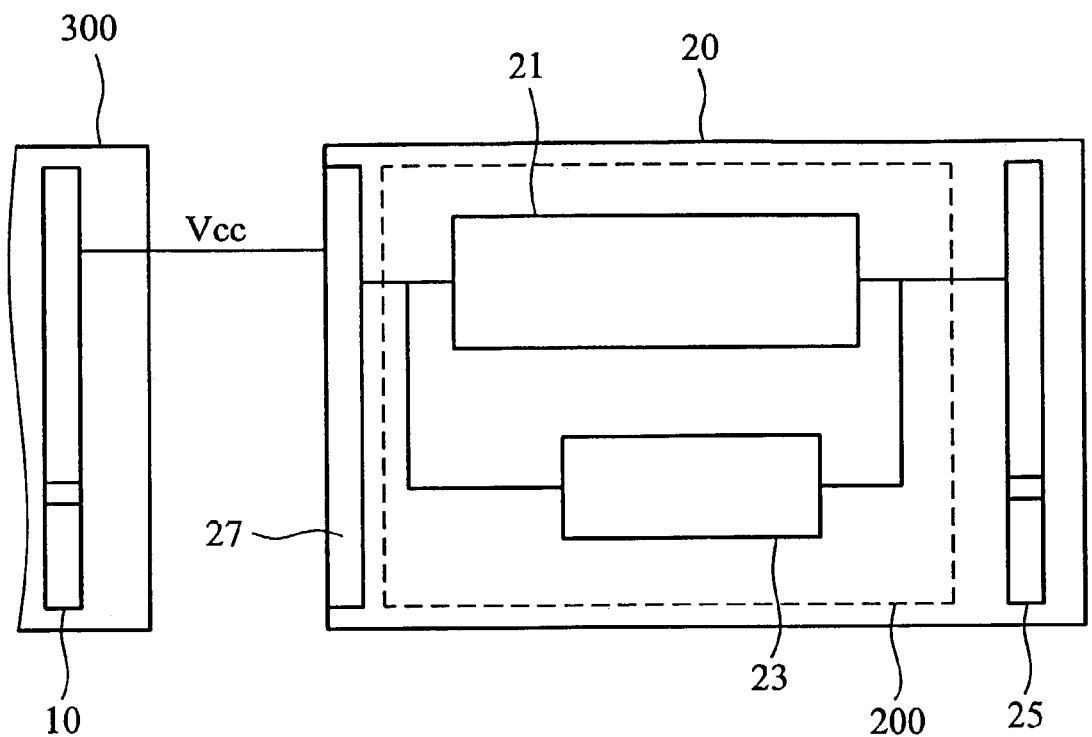
FIG. 1 is a block diagram of the present invention.

FIG. 1 is a block diagram of the present invention. PCI slots 10 and a voltage adaptor card 20 are shown in FIG. 1. The voltage adaptor card 20 includes a voltage converter 200, PCI slots 25, and pins 27. The voltage converter 200 includes a regulator 21 and an adjustment circuit 23. The PCI slots 10 provide 5V voltage. An output Vout of the regulator 21 provides interface cards inserted in the PCI slots 25 with 3.3V voltage.

Figure 2:
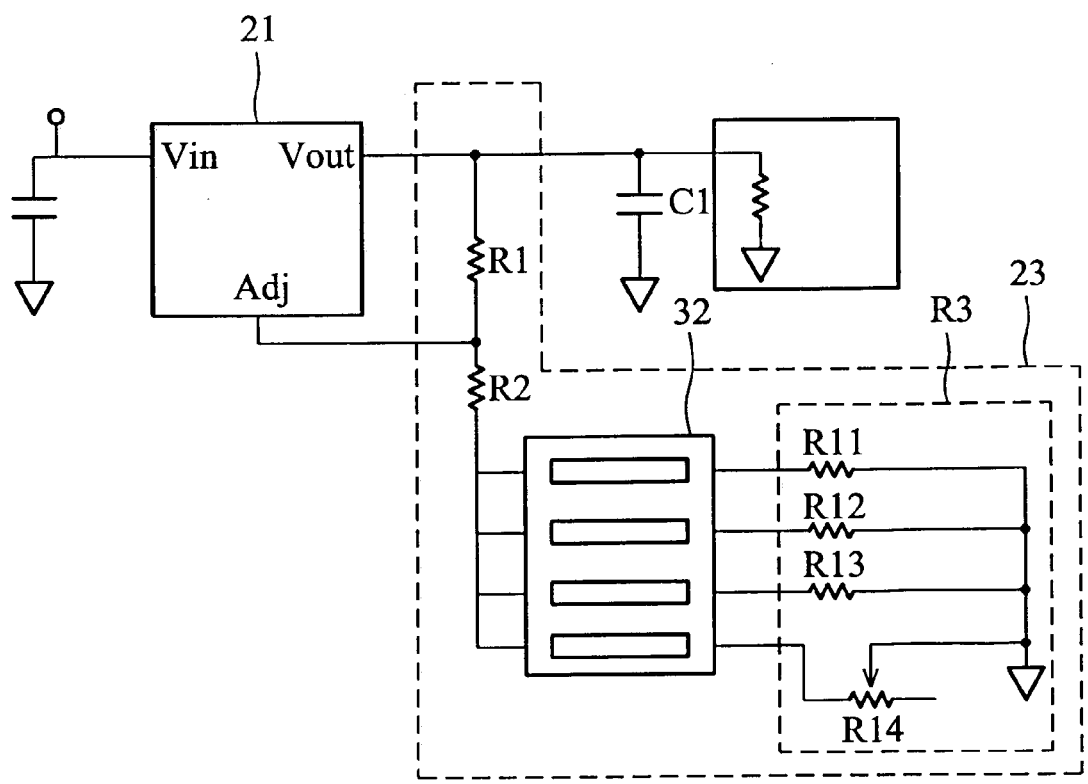
FIG. 2 is a block diagram of the voltage converter.

FIG. 2 is a block diagram of the voltage converter. The voltage converter 200 includes a regulator 21, resistors R1, R2, dip switch 32, resistors R11, R12, R13, and variable resistor R14. The dip switch 32 is used for selecting resistors R11, R12, R13, and variable resistor R14. The regulator 21 is a linear regulator having three terminals, an input terminal Vin, an adjustment terminal Adj, and an output terminal Vout. The resistors R1, R2, dip switch 32, and resistor R3 forms an adjustment circuit 23, a feedback circuit. A junction of the resistors R1 and R2 is coupled to the adjustment terminal Adj of the regulator 21. The voltage of the output terminal Vout is determined by a reference voltage Vref from the regulator 21, a ratio of the resistors R2 and R1, a ratio of the resistors R3, selected by the dip switch 32, and R1, and a product of the adjust current Iadj and resistors R2, R3.

$$Vout = Vref(1+(R2+R3)/R1) + Iadj*(R2+R3)$$

A capacitor C1 is used for frequency compensation and stabilizing the regulator 21.

Figures 3, 4:
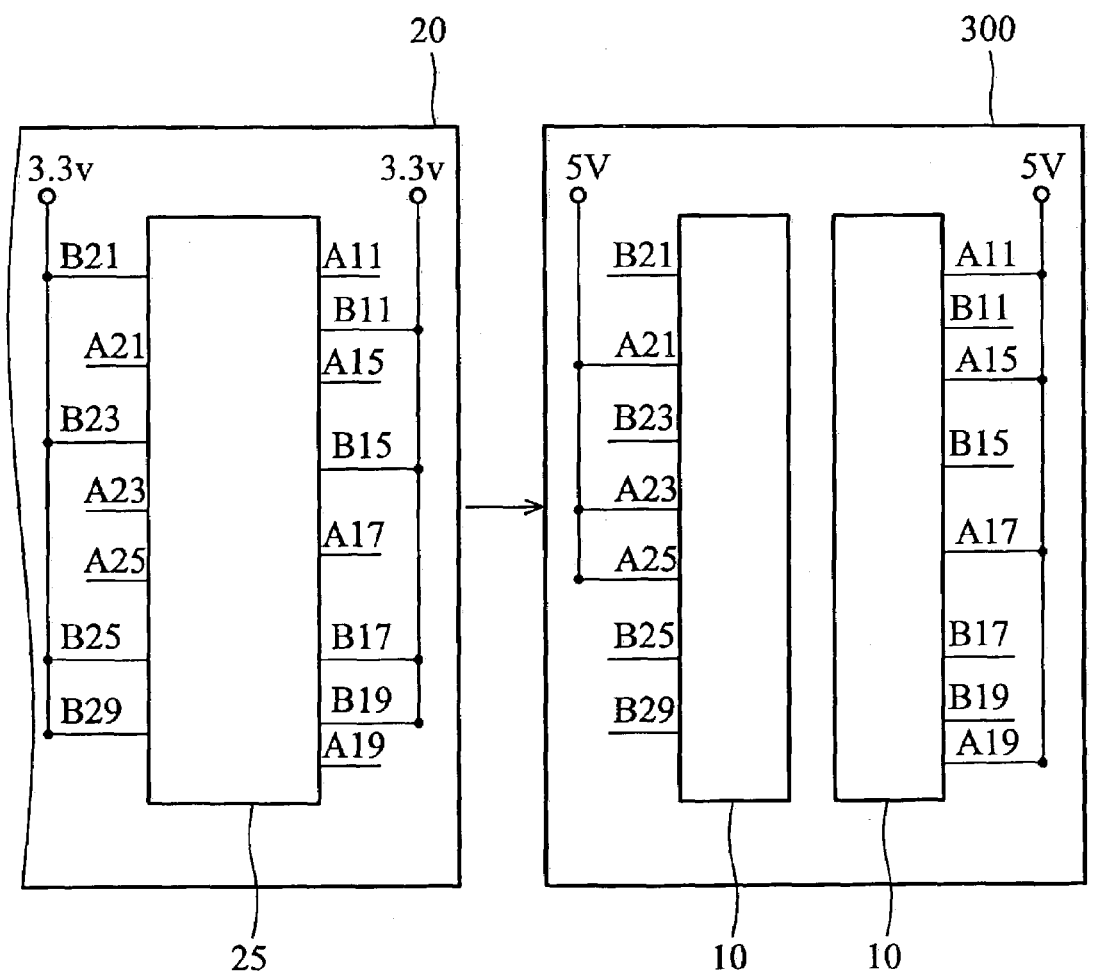
FIG. 3 shows a table of output voltages selected by the dip switch.
FIG. 4 shows a pin assignment of PCI slots.

FIG. 3 shows a table of output voltages selected by the dip switch. The dip switch 32 includes four switches S1, S2, S3, and S4. As shown in FIG. 3, when the switch S1 is turned on and the others are turned off, the dip switch 32 selects the resistor R11 coupled to the resistor R2, thus the output terminal Vout of the regulator 21 has a voltage about 3V. When the switch S2 is turned on and the others are turned off, the dip switch 32 selects the resistor R12 coupled to the resistor R2, thus the output terminal Vout of the regulator 21 has a voltage about 3.3V. When the switch S3 is turned on and the others are turned off, the dip switch 32 selects the resistor R13 coupled to the resistor R2, thus the output terminal Vout of the regulator 21 has a voltage about 3.6V. When the switch S4 is turned on and the others are turned off, the dip switch 32 selects the variable resistor R14 coupled to the resistor R2 thereby adjusting the output terminal Vout of the regulator 21. The resistors R11, R12, and R13 are used for coarse tuning, and the variable resistor R14 for fine tuning.

FIG. 4 is a block diagram of PCI slots. As shown in FIG. 4, both the PCI slots 10 and the PCI slots 25 have pins A11, A15, A17, A19, a21, A23, and A25, assigned for 5V by the outdated PCI spec, and unused pins B11, B15, B17, B19, B21, B23, B25, and B29. The unused pins B11, B15, B17, B19, B21, B23, B25, and B29 are assigned for 3.3V by new PCI spec. The PCI slots 10 are located in the motherboard 300, providing only 5V voltage. When the pins 27 on the voltage adaptor card 20 are inserted into the PCI slots 10 on the motherboard 300, 5V voltage is supplied to the voltage converter 200 through pins A11, A15, A17, A19, a21, A23, and A25 of the pins 27. The output terminal of the voltage converter 200 is coupled to the unused pins B11, B15, B17, B19, B21, B23, B25, and B29 to provide 3.3V voltage and satisfying pin assignments of the new PCI spec.

The voltage adaptor card has the following advantages.
(1) The voltage converter adapts voltage to that required for PCI slots from the motherboard, for broader application.
(2) The voltage of the PCI slots is adjusted by feedback resistors thereby testing interface cards on the PCI slots. The motherboards providing single voltage can continue to be used without modification.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A voltage adaptor card for a motherboard having first slots to provide a first voltage source, comprising:
    second slots;
    a plurality of pins for insertion into the first slots; and
    a voltage converter having an input terminal and an output terminal, wherein the input terminal is coupled to the first voltage source through the plurality of pins, and the output terminal is coupled to the second slots and outputs a second voltage source;
    a regulator having a first input terminal, an adjustment terminal, and a first output terminal, wherein the input terminal of the regulator is coupled to the first voltage source through the plurality of pins; and
    an adjustment circuit having a second input terminal and a second output terminal, wherein the input terminal of the adjustment circuit is coupled to the output terminal of the regulator, and the output terminal of the adjustment circuit is coupled to the adjustment terminal of the regulator.

2. The voltage adaptor card as claimed in claim 1 wherein the adjustment circuit includes:
    a first resistor coupled between the second input terminal of the adjustment circuit and the second output terminal of the adjustment circuit; and
    a second resistor coupled between the second output terminal of the adjustment circuit and a ground potential.

3. The voltage adaptor card as claimed in claim 1 wherein the adjustment circuit includes:
    a first resistor coupled between the second input terminal of the adjustment circuit and the second output terminal of the adjustment circuit;
    a second resistor coupled to the second output terminal of the adjustment circuit;
    a dip switch having a plurality of first terminals, a plurality of second terminals, and a plurality of switches, wherein the plurality of first terminals are all coupled to the second resistor, the plurality of switches are used for selecting the plurality of first terminals coupled to the plurality of second terminals; and
    a plurality of third resistors coupled between the plurality of second terminals of the dip switch and a ground potential.

4. The voltage adaptor card as claimed in claim 3 wherein the plurality of third resistors includes a variable resistor.

5. The voltage adaptor card as claimed in claim 1 wherein the first slots are PCI slots.

6. The voltage adaptor card as claimed in claim 1 wherein the second slots are PCI slots.

7. The voltage adaptor card as claimed in claim 1 wherein the first voltage source has a voltage of 5V.

8. The voltage adaptor card as claimed in claim 1 wherein the second voltage source has a voltage of 3.3V.

9. A voltage adaptor card for a motherboard having first slots to provide the first voltage source, comprising:
    second slots;
    a plurality of pins for inserting the first slots;
    a regulator having an input terminal, an adjustment terminal, and an output terminal, wherein the input terminal of the regulator is coupled to the first voltage source through the plurality of pins, and the output terminal is coupled to the second slots and outputs a second voltage source;
    a first resistor coupled between the output terminal of the regulator and the adjustment terminal of the regulator; and
    a second resistor coupled between the adjustment terminal of the regulator and a ground potential.

10. The voltage adaptor card as claimed in claim 9 further comprising:
    a dip switch having a plurality of first terminals, a plurality of second terminals, and a plurality of switches, wherein the plurality of first terminals are all coupled to the second resistor, and the plurality of switches are used for selecting the plurality of first terminals coupled to the plurality of second terminals; and
    a plurality of third resistors coupled between the plurality of second terminals of the dip switch and the ground potential.

11. The voltage adaptor card as claimed in claim 10 wherein the plurality of third resistors includes a variable resistor.

12. The voltage adaptor card as claimed in claim 9 wherein the first slots are PCI slots.

13. The voltage adaptor card as claimed in claim 9 wherein the second slots are PCI slots.

14. The voltage adaptor card as claimed in claim 9 wherein the first voltage source has a voltage of 5V.

15. The voltage adaptor card as claimed in claim 1 wherein the second voltage source has a voltage of 3.3V.

16. The voltage adaptor card as claimed in claim 1 wherein the first slots are PCI slots and the second slots are PCI slots.

17. The voltage adaptor card as claimed in claim 1 wherein the second slots are similar in configuration to the first slots, whereby plurality of the voltage card are mutually interconnectable by mating the second slots of a first one of the voltage card with the pins of a second one the voltage cards.

* * * * *